United States Patent [19]

Schlueter

[11] Patent Number: 5,601,486

[45] Date of Patent: Feb. 11, 1997

[54] COTTON BASKET DOOR AND LID STRUCTURE

[75] Inventor: Francis E. Schlueter, Des Moines, Iowa

[73] Assignee: Deere & Company, Moline, Ill.

[21] Appl. No.: 510,889

[22] Filed: Aug. 3, 1995

[51] Int. Cl.$^6$ .................................................. A01F 12/60
[52] U.S. Cl. ................................ 460/119; 56/28; 298/11
[58] Field of Search .................................. 460/119, 150, 460/8; 56/28, 1, 16.4 R; 298/11, 18

[56] References Cited

U.S. PATENT DOCUMENTS

| | | | |
|---|---|---|---|
| 4,059,942 | 11/1977 | Trimble et al. | 56/30 |
| 4,255,919 | 3/1981 | Copley et al. | 56/30 |
| 4,348,856 | 9/1982 | Copley et al. | 56/30 |
| 4,520,617 | 6/1985 | Fachini et al. | 56/28 X |
| 4,662,160 | 5/1987 | Hubbard et al. | 56/16.6 |
| 4,793,126 | 12/1988 | Wood et al. | 56/16.6 |
| 4,888,940 | 12/1989 | Deutsch | 56/28 X |
| 4,930,297 | 6/1990 | Schlueter et al. | 56/16.6 |
| 4,974,401 | 12/1990 | Deutsch | 56/28 |
| 4,996,831 | 3/1991 | Pearson et al. | 56/16.6 |
| 5,407,390 | 4/1995 | Carney et al. | 460/119 |

Primary Examiner—Terry Lee Melius

[57] ABSTRACT

A cotton harvester basket is pivotally connected inwardly of the side walls and has a flat, gravity actuated lid that opens at the end of the dump cycle to prevent cotton loss. The dump or slope side of the basket includes a pivoting door, also gravity actuated, connected by a linkage to the basket lid. The weight of the slope side door tends to open the basket lid near the final dump position of the basket. As the basket is pivoted downwardly to the lowered field-working position, the weight of the lid forces the slope side door to the closed position.

23 Claims, 2 Drawing Sheets

COTTON BASKET DOOR AND LID STRUCTURE

BACKGROUND OF THE INVENTION

1. Field of the Invention

The present invention relates generally to dumpable basket structure for cotton harvesters, and more specifically to cotton basket door and lid structure for improved dumping with a minimum amount of cotton loss and weight shift during pivoting of the basket to dump position.

2. Related Art

Presently available cotton harvesters include a large basket to contain harvested cotton and dump the cotton into trailers or module builders or the like. Typically, dump cylinders rotate the basket about a fore-and-aft extending axis through an angle of greater than 90 degrees to extend the dump side of the basket over the trailer or module builder. As the basket is pivoted, a linkage connected between the basket support frame and the basket lid causes the lid to pivot towards an open position.

One problem with the typical basket is the shift of the center of gravity outwardly in the direction of the dump which causes instability. The outward pivoting of a relatively heavy basket lid during the dump cycle adds to the problem of weight shift. Although various methods of dealing with such instabilities have been devised for self-propelled cotton harvesters, the problem is particularly acute for smaller tractor mounted harvesters having a smaller transverse wheel spacing and less weight to counterbalance the shifted basket load. Some basket structures, such as shown in U.S. Pat. No. 5,407,390, of common ownership with the present application, include fold-down doors with conveyors to extend the dump outwardly while maintaining a small shift in the center of gravity. Other types of basket structures, such as shown in U.S. Pat. No. 4,974,401, also include extension structure connected to the dump side of the basket which swings outwardly with opening of the basket lid. The conveyors and doors and the hydraulics necessary to operate them add cost and complexity to the harvester system which, particularly in more economically priced machines such as the tractor-mounted harvesters, is often unacceptable.

A common problem with many of the previously available types of basket arrangements is cotton loss which results from early opening of the basket lid. The linkage connected between the lid and the frame begins to pivot the lid towards an open dump position well before the basket has reached the final dump position over the trailer or module builder, and under certain conditions, particularly windy conditions, cotton is lost. Often, very long linkages are required between the basket and the frame. If the lid or linkage should bind during the dump cycle, the basket or linkages may be damaged. In many basket structures, the lid is a dome shaped member which, when opened, allows cotton in the upper portion of the basket near the basket walls to spill out away from the desired cotton dump path. As a result, the operator is unable to precisely unload and distribute the cotton into a receiving receptacle such as a module builder.

BRIEF SUMMARY OF THE INVENTION

It is therefore an object of the present invention to provide an improved basket structure for a cotton harvester. It is a further object to provide such as structure which overcomes most or all of the aforementioned problems.

It is another object of the invention to provide an improved basket structure which is particularly useful with a tractor mounted harvester. It is another object to provide such a structure which reduces the outward and upward shift of the basket center of gravity during the dump cycle for increased dump stability. It is another object to provide such a structure which is relatively simple and inexpensive in construction. It is yet another object to provide such a structure wherein opening of the lid does not adversely shift the basket center of gravity outward.

It is still a further object of the invention to provide an improved cotton harvester basket structure having a lid and door structure which reduces basket dumping height and weight transfer. It is a further object to provide such a structure with a linkage arrangement that assures opening of the lid only after the basket closely approaches the final dump position so that cotton loss during dumping, especially in windy conditions, is reduced. It is another object to provide such a structure which better retains cotton within the confines of the basket walls as the lid opens and provides more precise dumping and cotton distribution than most previously available pivoting basket structures.

It is yet another object of the present invention to provide a simple and inexpensive door and lid structure for a cotton harvester basket particularly useful with a tractor mounted harvester. It is a further object to provide such a structure which obviates long linkages between the harvester basket and frame and which does not require additional hydraulic drives or cylinders. It is still another object to provide such a structure which substantially gravity operated.

A cotton harvester basket is pivotally connected inwardly of the side walls and has a flat, gravity actuated lid that opens at the end of the dump cycle to prevent cotton loss. The dump or slope side of the basket includes a slope side door connected by a linkage to the basket lid which opens with the lid to increase the size of the dump opening and to extend the dump to help reduce cotton loss. The weight of the slope side door tends to open the basket lid near the final dump position of the basket. As the basket is lowered, the weight of the lid causes the slope side door to close. The structure is simple and inexpensive, does not require additional cylinders or drives, and is less subject to damage if a linkage, lid or door binds during the dump cycle. The shift of the center of gravity of the filled basket upwardly and outwardly during the dump is minimal for good harvester stability. The simple, flat lid transfers less weight outwardly in the open dump position than at least most previously available dome shaped lids. The flat lid construction and location of the lid pivot at the top edge of the basket assure better cotton retention between basket walls and more precise dumping, compared to pivoting baskets that have dome shaped lids.

These and other objects, features and advantages of the present invention will become apparent to one skilled in the art upon reading the following detailed description in view of the drawings.

DETAILED DESCRIPTION OF THE DRAWINGS

Figure 1:
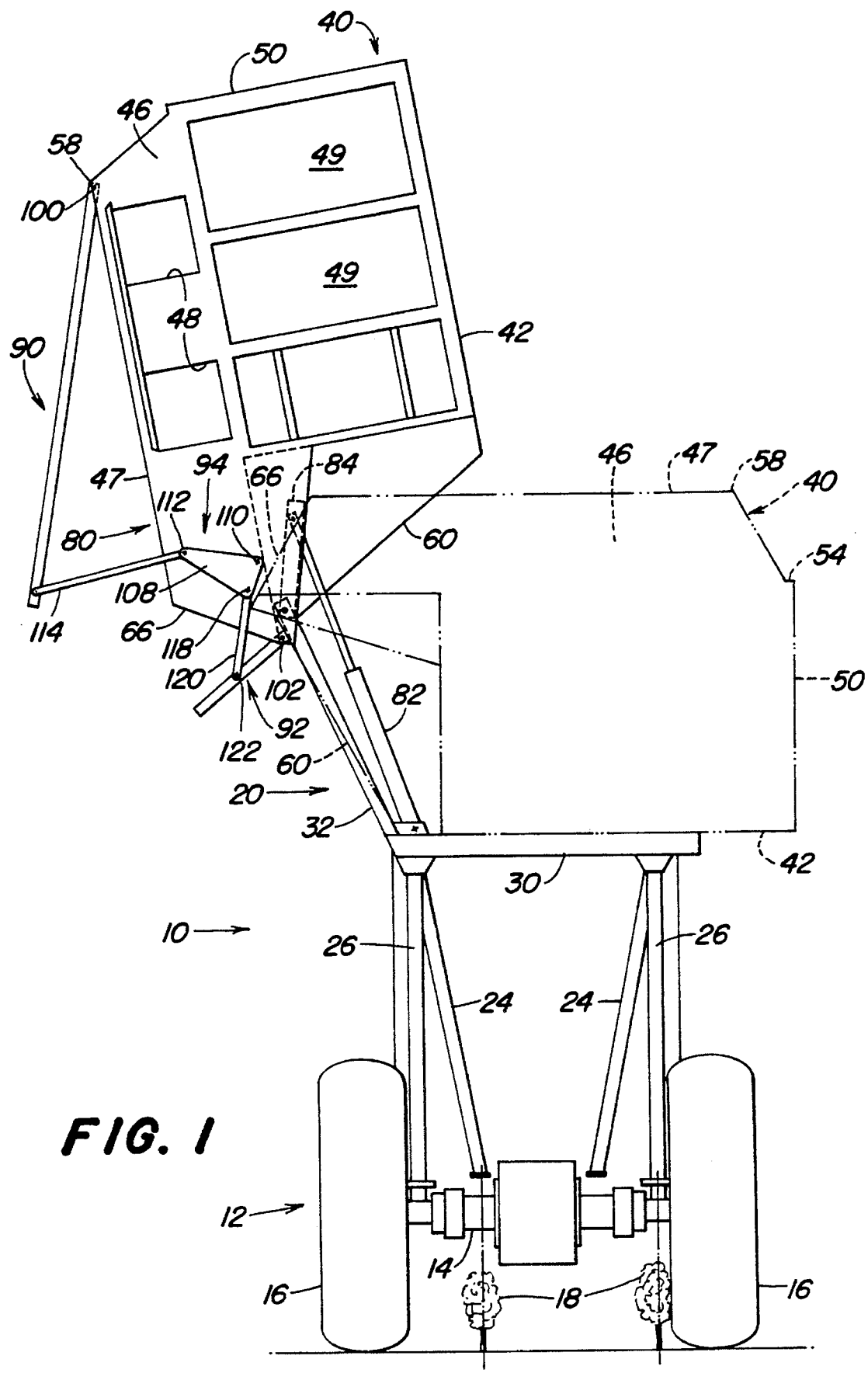
FIG. 1 is a rear view of a portion of a tractor mounted cotton harvester having a dumpable basket with movable lid and extension door structure and showing the basket in the dump position (solid lines) and the field-working position (broken lines).

Referring now to FIG. 1, therein is shown a portion of a cotton harvester 10 mounted on a tractor 12 having a fore-and-aft extending tractor frame 14 supported for forward movement over a field of cotton plants by rear drive wheels 16 and forward steerable wheels (not shown). Preferably the harvester 10 is a tractor mounted cotton picker having a frame supported on the tractor frame 14. Row harvesting units (not shown) are supported from the rear of the tractor frame 14 for removing cotton from transversely spaced rows 18 of cotton plants and directing the cotton upwardly and forwardly to basket structure 20 supported above the tractor 12 on forward and rearward basket supports 24 and 26 having lower ends connected to the tractor frame 14.

The basket structure 20 includes a fore-and-aft extending rectangular frame 30 supported horizontally from the upper ends of the supports 24 and 26. Basket support masts 32 extend upwardly and outwardly in the direction of the dump side of the harvester 10 (the left side of the harvester as viewed in the direction of travel in FIG. 1) to end pivot areas defining a fore-and-aft extending horizontal basket pivot axis, indicated generally at 36, which as shown in FIG. 1 is located outwardly of left wheel 16 on the dump side of the harvester 10 and inwardly of the left-most extremity of the basket structure 20.

Figure 3:
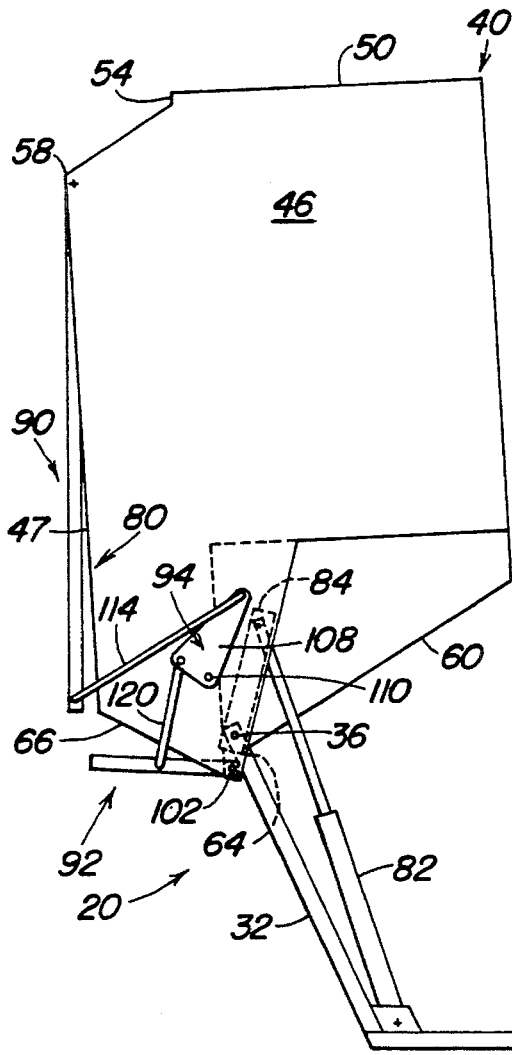
FIG. 3 is a view similar to that of FIG. 2 but showing the basket rotated several more degrees towards the dump position so the lid is just beginning to open and the extension door is beginning to pivot outwardly.

The basket structure 20 includes a basket 40 is pivotally connected to the end pivot areas of the support masts 32 for rocking about the axis 36 between a lowered field-working position (broken lines of FIG. 1) and a raised dump position (FIG. 3). The basket 40 includes a rectangular floor 42, which, when the basket is in the field-working position, is supported horizontally on the frame 30 with the side of the floor opposite the dump side of the harvester projecting outwardly towards the right to a position outside the right wheel 16 (FIG. 1). Complementary shaped front and rear or end walls 46 extend upwardly from the floor 42 to upper edges 47 and generally close the front and rear of the basket 40. The rear wall 46 includes a pair of inlet openings 48 which, when the basket is in the field-working position, align with outputs in the air ducts leading from the harvesting units. Screens or grills 49 at various locations in the basket 40 provide an escape path for small trash while retaining the harvested cotton in the basket.

On the side of the basket (right side) opposite the dump side of the basket 40, a side wall 50 extends vertically between the walls 46 from the floor 42 to a location 54 slightly above the level of the basket pivot axis 36. At the location 54 the side wall 50 angles towards the dump side of the harvester and terminates in an upper edge 58 extending horizontally (when the basket 40 is in the field-working position) between the edges 47 of the front and rear walls 46.

On the dump side of the basket (left side) a dump side wall 60 slopes upwardly and outwardly from the floor 42 at an angle of approximately 30 degrees from vertical when the basket is in the field-working position. At a location 64, the dump side wall terminates in a horizontally extending edge. The end walls 46 have upper dump side edges 66 which extend upwardly and slope inwardly from the location 64 and terminate at the edges 47. A basket opening indicated generally at 80 in FIG. 1 is defined by the edges 47, 58 and 66 which, when the basket 40 is in the field-working position, extends horizontally from the edge 58 and then downwardly between the side edges 66.

A pair of basket lift cylinders 82 have cylinder ends connected to the left or dump side of the ends of the frame 30. Each of the cylinders 82 has a rod end connected to one end of a cylinder support angle 84 at a location inwardly and downwardly from the area around the pivot 36. The angle 84 is connected to the wall 46 and has an opposite end extending through and reinforcing the pivot area for the axis 36. The cylinders 82 are connected to a conventional hydraulic system on the harvester which extends and retracts the cylinders for pivoting the basket about the inwardly offset pivot axis 36 between the field-working and dump positions.

Figure 4:
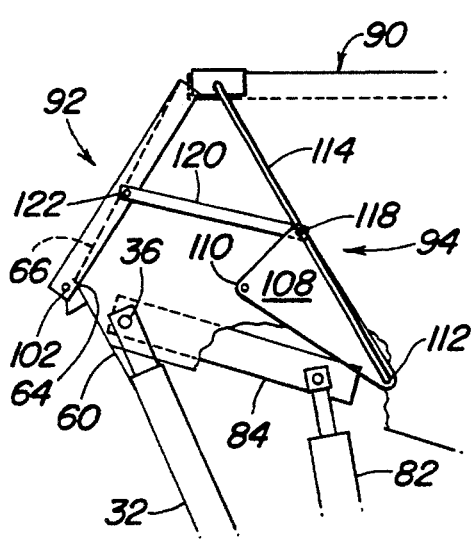
FIG. 4 is an enlarged view of the upper dump side portion of the basket with parts removed to more clearly show the location of the basket pivot area and door and lid linkage structure in the field-working position.

To close the basket opening 80 to harvested cotton when the basket is in the field-working position and thereby provide a generally closed receptacle for harvested cotton, a gravity actuated lid structure 90 and gravity actuated slope side door structure 92 are connected to the upper portion of the basket 40 and are operationally interconnected by linkage structure 94 located adjacent each of the end walls 46. The lid structure 90 and door structure 92 are movable under the influence of gravity between a closed or containment position (broken lines of FIG. 1, and FIGS. 2 and 4) and open dump and extension positions (solid lines of FIG. 1). The structures 90 and 92 are connected to the basket structure, and to each other by the linkage structure 94, in such a manner that the lid 90 will not start to open until the basket is very close (FIG. 3) to the final dump position of FIG. 1. As shown, the basket 40 in the final dump position is rotated approximately 100 degrees from the field-working position, and the basket lid structure begins to open when the basket is less than about 20 degrees and preferably about 10 to 15 degrees from the fully rotated dump position.

The lid structure 90 is a substantially flat, rectangular structure generally conforming to the opening defined by the edges 47 and 58. The lid structure 90 is pivotally connected to the upper end of the side wall 50 near the edge 58 for rocking about a fore-and-aft extending axis 100. The door structure 92 is also substantially flat and rectangular in configuration having a lower edge pivotally connected between the end walls 46 for rocking about an axis 102 outwardly adjacent and parallel to the axis 36.

Each of the linkage structures 94 includes a triangular crank member 108 (FIGS. 1 and 4) pivotally connected at its lower outermost corner 110 to the corresponding end wall 46 for rocking about a fore-and-aft extending axis. The crank member 108 includes a radially outermost corner 112 pivotally connected to one end of a lid link 114. The opposite end of the lid link 114 is pivotally connected to the end of the dump side of the lid structure 90. A third corner 118 of the crank member 108 is pivotally connected to one end of a door link 120. The opposite end of the door link 120 is pivotally connected to the side edge of the door structure 92 at a central location 122 along the edge.

Figure 2:
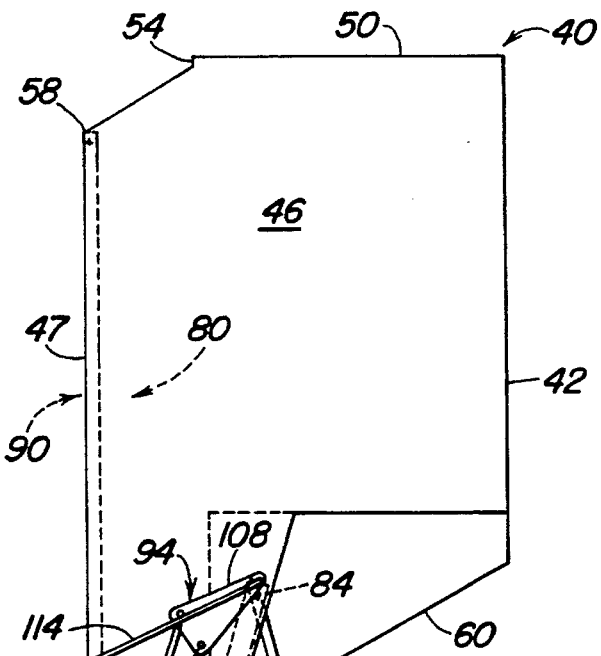
FIG. 2 is a rear view of the basket of FIG. 1 rotated upwardly about a basket pivot axis and approaching the position wherein the lid begins to open.

As the basket 40 is rotated upwardly by extending the cylinders 82, the door structure 92 moves to a position wherein the weight of the door structure acting through the door link 120 tends to bias the crank member 108 in the counterclockwise direction as viewed in FIG. 2. The bias acts through the lid link 114 to urge the lid structure 90 in the clockwise direction about the axis 100. As the basket approaches the dump position, the force of gravity acting to move the lid structure 90 against the bias to the closed position is overcome by the force of gravity due to the weight of the door structure 92 and the cotton pressing downwardly on the door structure. The member 108 rotates in the counterclockwise direction as the door structure moves to the fully open extended position (solid lines of FIG. 1) and the link 114 pivots the lid structure 90 outwardly to a maximum open position of about one meter. The door structure forms a natural extension of the slope side wall 60 to extend the dump outwardly a substantial distance beyond the left wheel 16.

After the basket 40 is fully dumped, the cylinders 82 are retracted to rotate the basket back towards the field-working position. The force of gravity acting to close the lid structure 90 after the basket is pivoted to a position of within about 45 to 30 degrees from the final field-working position urges the crank member 108 in the clockwise direction to pull on the link 120 and force the door structure 92 to the closed position of FIG. 4. In the field-working position of the basket 40, the weight of the lid structure 90 and the weight of the door structure 92 both act to retain the door and lid structures in the closed position.

The above-described door and lid structure tends to open the basket lid structure 90 relatively quickly very near the final dump position of the basket. Upon return of the basket towards the field-working position, the lid structure 90 begins to close relatively slowly as the door structure 92 approaches a nearly vertical position. The flat lid structure 90 is light in weight and causes only a minimal shift in weight outwardly during dumping. The inwardly offset pivot axis 36 also helps to reduce center of gravity shifting during the dump cycle. Preferably, the row units 18 are offset towards the right (FIG. 1) of the center of the harvester to harvest rows 18 likewise offset towards the right so the weight of the row units moves the harvester center of gravity to the right of the tractor centerline and helps to counterbalance shift in the center of gravity of the basket towards the dump side of the harvester during dumping.

With the flat lid structure 92, the end walls 46 and opposite side wall 50 extend upwardly the full height of the basket so that cotton is retained more positively in the basket as the lid structure begins to open. The dump is more controllable, and cotton rolls more precisely into the module builder as a result of the relatively high side walls.

Having described the preferred embodiment, it will become apparent that various modifications can be made without departing from the scope of the invention as defined in the accompanying claims.

I claim:

1. In a cotton harvester having a fore-and-aft extending frame adapted for forward movement over a field of cotton plants, dumpable cotton basket structure for receiving harvested cotton and dumping the harvested cotton in a receptacle such as a module builder or cotton trailer, the basket structure comprising:

support structure extending upwardly from the frame;

a cotton basket having a floor, front and rear end walls extending upwardly from the floor, a dump-side wall extending upwardly from the floor between the end walls to a pivot area, and an upright side wall opposite the dump-side wall;

a basket pivot rockably connecting the basket pivot area to the support structure for rocking of the basket about a fore-and-aft extending basket axis;

cylinder structure connected between the frame and the basket for rocking the basket about the basket axis between a lowered field-working position and raised dump position, wherein in the raised dump position, the dump side wall is pivoted upwardly and outwardly from the field-working position slightly more than approximately 90 degrees and the dump side wall is angled downwardly to facilitate dumping of the cotton from the basket;

the basket further including movable door structure having open and closed positions, and an upper lid extending between the dump side and upright walls and pivotally connected for rocking with respect to the walls about a fore-and-aft extending lid axis located near the upright side wall, the upper lid rockable between a containment position defining with the walls and floor an area generally closed to egress of cotton when the movable door structure is in the closed position, and an open position wherein a portion of the lid is rocked outwardly from the walls when the basket is in the raised dump position to define a downwardly and outwardly directed opening for egress of cotton from the basket when the movable door structure is in the open position; and wherein the upper lid is biased towards the containment position until the basket is substantially in the dump position so that loss of cotton from the basket is minimized as the basket is rocked to the dump position.

2. The invention as set forth in claim 1 wherein the upper lid is biased by gravity to the containment position, the lid remaining in the containment position substantially entirely by gravity until the basket is within less than approximately 15 degrees of the dump position.

3. The invention as set forth in claim 1 wherein the end walls and the upright side wall have uppermost edges lying substantially in a plane, and wherein the lid is substantially flat and pivotally connected near the upper edge of the upright side wall and lies generally in the plane when the basket is in the field-working position.

4. The invention as set forth in claim 1 wherein the movable door structure comprises an extension door connected to an uppermost portion of the dump side of the basket, the extension door generally closing the dump side of the basket when the door structure is in the closed position, and a linkage connected between the lid and the extension door.

5. The invention as set forth in claim 4 wherein the lid is substantially gravity activated for movement between the containment and open positions, and wherein the linkage is responsive to gravity to move the door structure between the open and closed positions.

6. The invention as set forth in claim 4 wherein the lid begins opening at an angle of approximately 90 degrees from the field-working position, the basket in the raised dump position angled approximately 100 degrees from the field-working position.

7. In a cotton harvester having a fore-and-aft extending frame, a basket having a dump side wall and an opposite side wall extending upwardly from a floor and end walls connected to the side walls, support structure pivotally connecting the dump side of the basket to the frame and cylinder structure for rocking of the basket between a field-working position and a raised dump position, wherein the dump side wall is sloped downwardly when the basket is in the dump position, gravity actuated door and lid structure connected to the basket and having a closed harvest position for containing cotton in the basket when the basket is in the field-working position, wherein the gravity actuated door and lid structure opens when the basket closely approaches the raised dump position to prevent cotton loss.

8. The invention as set forth in claim 7 wherein the door and lid structure includes a movable gravity actuated slope side door and a basket lid, and wherein the slope side door is connected by a linkage to the basket lid.

9. The invention as set forth in claim 8 wherein the slope side door has an open position generally extending the dump side of the basket outwardly and a closed position cooperating with the lid to close the basket to harvested cotton.

10. The invention as set forth in claim 9 wherein the weight of the slope side door tends to open the basket lid near the raised dump position of the basket.

11. The invention as set forth in claim 9 wherein the weight of the lid causes the slope side door to close as the basket is moved from the raised dump position towards the field-working position.

12. The invention as set forth in claim 7 wherein the door and lid structure includes a substantially flat lid, and when the basket is in the field-working position, the lid is in a horizontal position and the dump side wall is sloped outwardly in the upward direction.

13. The invention as set forth in claim 9 wherein the dump side of the basket is pivotally connected to the support structure at a location inwardly of the dump side wall.

14. The invention as set forth in claim 13 wherein the dump side door is pivotally connected to the basket at a location outwardly of the pivotal connection of the basket to the support structure.

15. The invention as set forth in claim 14 wherein, in the field-working position of the basket, the dump side wall is sloped outwardly in the upward direction and the dump side door is sloped inwardly in the upward direction.

16. The invention as set forth in claim 8 wherein the linkage includes crank structure pivotally connected to the basket end walls for rocking about a crank axis, a first link having one end connected to the crank structure radially outwardly from the crank axis and an opposite end connected to the door, a second link having an end connected to the crank structure radially outwardly from the crank axis and a second end connected to the lid.

17. The invention as set forth in claim 16 wherein the weight of the slope side door tends to open the basket lid near the raised dump position of the basket.

18. The invention as set forth in claim 16 wherein the weight of the lid causes the slope side door to close as the basket is moved from the raised dump position towards the field-working position.

19. The invention as set forth in claim 17 wherein the basket lid begins to open when the basket is within approximately 10 degrees of the dump position.

20. The invention as set forth in claim 15 wherein, when the basket is in the dump position, the dump side wall and the door are sloped downwardly in the outward direction at approximately the same angle, the door extending the slope side of the basket outwardly in the basket dump position.

21. The invention as set forth in claim 7 wherein the opposite side wall and the end walls have uppermost edges defining a generally rectangular upper opening, wherein the door and lid structure includes a lid that is flat and generally conforms to and closes the rectangular opening when the basket is in the field-working position.

22. The invention as set forth in claim 21 wherein the lid is pivotally connected to the uppermost edge of the opposite wall.

23. The invention as set forth in claim 7 wherein the harvester has a centerline and is adapted to harvest rows of cotton offset towards the side of the centerline opposite the dump side of the harvester so that center of gravity of the harvester in the field-working position is located on the side of the centerline opposite the dump side to help counterbalance shift in weight towards the dump side when the basket is raised to the dump position.

\* \* \* \* \*